United States Patent [19]

Mizukami et al.

[11] Patent Number: 5,276,606
[45] Date of Patent: Jan. 4, 1994

[54] NUMERICAL CONTROL INFORMATION GENERATING APPARATUS

[75] Inventors: Yuto Mizukami; Masato Ryoki, both of Niwa, Japan

[73] Assignee: Okuma Corporation, Aichi, Japan

[21] Appl. No.: 722,553

[22] Filed: Jun. 25, 1991

[30] Foreign Application Priority Data

Jun. 29, 1990 [JP] Japan .................. 2-171534

[51] Int. Cl.⁵ .................. G06F 15/46; G05B 19/42
[52] U.S. Cl. .................. 364/191; 364/474.22
[58] Field of Search .................. 364/474.22, 474.24, 364/474.26, 191

[56] References Cited

U.S. PATENT DOCUMENTS

| | | | |
|---|---|---|---|
| 4,445,182 | 4/1984 | Morita et al. | 364/474.31 |
| 4,519,026 | 5/1985 | Nozawa et al. | 364/474.26 |
| 4,661,912 | 4/1987 | Imanishi | 364/474.01 |
| 4,750,105 | 6/1988 | Ohkawa et al. | 364/191 |
| 4,788,636 | 11/1988 | Shiratori et al. | 364/191 |
| 4,855,898 | 8/1989 | Kawamura et al. | 364/191 |
| 4,891,763 | 1/1990 | Kuriyama | 364/474.25 |
| 4,928,221 | 5/1990 | Belkhiter | 364/191 |
| 5,115,400 | 5/1992 | Watanabe et al. | 364/474.24 |

Primary Examiner—Jerry Smith
Assistant Examiner—Paul Gordon
Attorney, Agent, or Firm—Wenderoth, Lind & Ponack

[57] ABSTRACT

A plurality of parameter-sets, the components of which are parameter items for determining a machining method, are provided, stored in advance. The Most suitable machining method is determined for a subject workpiece by allowing an operator to select the most suitable parameter-set from among the plurality of the parameter-sets used in to determining the machining method.

2 Claims, 9 Drawing Sheets

| | | |
|---|---|---|
| LIMIT VALUE OF ANGLE FROM X-AXIS | PA = 20 | |
| LIMIT VALUE OF X-DIRECTIONAL LENGTH | PL = 15 | |
| LIMIT VALUE OF SIZE OF CUTTING STOCK | PD = 20 | |

FIG. 4

| | SET 1 | SET 2 | SET 3 |
|---|---|---|---|
| ANGLE FROM X-AXIS | 20 | 30 | 10 |
| X-DIRECTIONAL LENGTH | 15 | 10 | 20 |
| SIZE OF CUTTING STOCK | 20 | 30 | 15 |

NUMERICAL CONTROL INFORMATION GENERATING APPARATUS

BACKGROUND OF THE INVENTION

1. Field of the Invention

The present invention relates to a numerical control information generating apparatus for generating numerical control information from a before-machining shape and an after-machining shape of a workpiece.

2. Related Art Statement

A so-called numerically-controlled machine tool is arranged in a manner such that a machine tool is automatically controlled by numerical control information constituted by numerals and codes. The wide use of such machine tools has contributed greatly to automating machining operations, reducing machining cost and, shortening machining times.

The above-described numerically-controlled machine tool requires that information used to perform the numerical control operation be input prior to performing the machining operation. Recently, a numerical control information generating apparatus for generating numerical control information in accordance with data received in an interactive manner has been widely used in order to simplify the information input operation. In such a numerical control information generating apparatus, the numerical control information used to machine the subject workpiece is processed after inputting data denoting the material of the subject workpiece, the before-machining shape and the method of machining (the region to be machined, the cutting method, the cutting tool, the cutting conditions, the cutting order and the like). Furthermore, there has recently made available a numerical control information generating apparatus of a type in which numerical control information is generated after the method of machining has been automatically determined by inputting the before-machining shape and the after-machining shape of the workpiece.

Figure 1A:
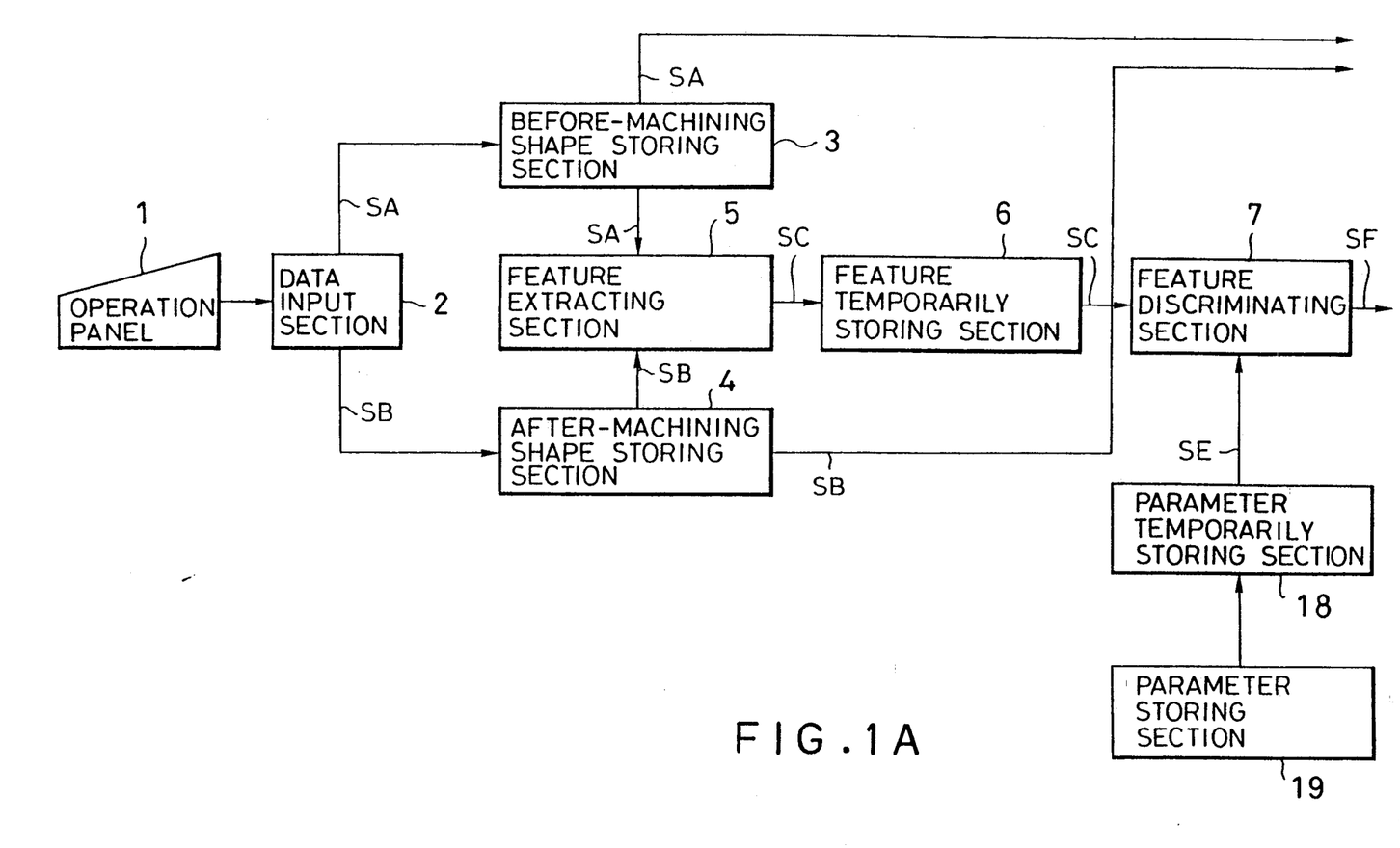
FIGS. 1A and 1B are block diagrams which illustrate among the conventional numerical control information generating apparatus.
Figure 1B:
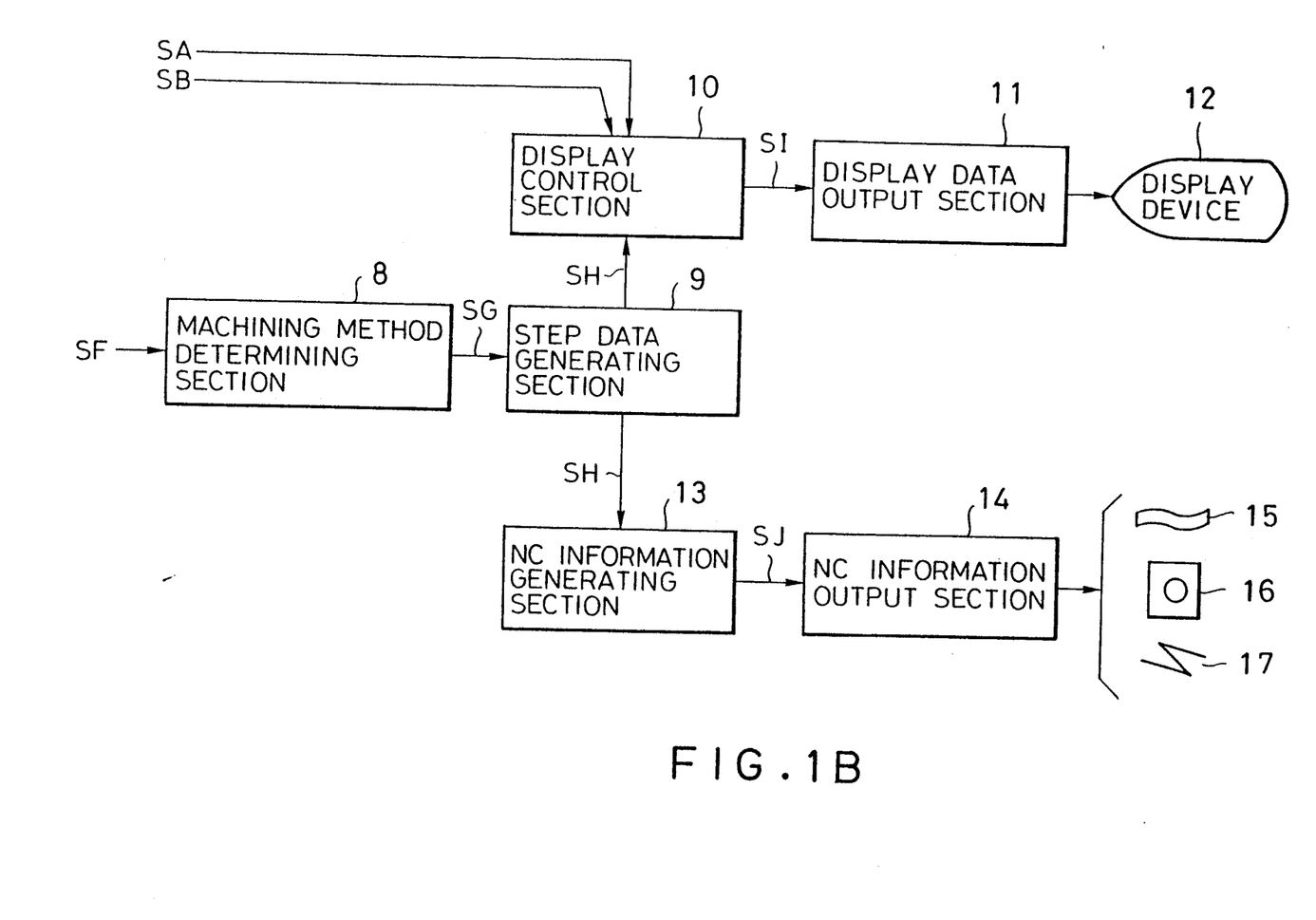

FIGS. 1A and 1B are a block diagrams which illustrate a conventional numerical control information generating apparatus. Referring to these drawings, before-machining shape SA and after-machining shape SB input by an operator through a control panel 1 such as a keyboard are, via a data input section 2, respectively stored in a before-machining shape storing section 3 and an after-machining shape storing section 4. The before-machining shape SA stored in the before-machining shape storing section 3 and the after-machining shape SB stored in the after-machining shape storing section 4 are read by a feature extracting section 5. Thus, shape feature SC, which is a factor used to determine the machining method, is extracted so as to be stored in a feature temporarily storing section 6. On the other hand, machining method determining parameter SE which is also used to specify the machining method is been previously stored in a parameter storing section 19 so as to be read and stored by the parameter temporarily storing section 18.

The shape feature SC stored in the feature temporarily storing section 6 and the machining method determining parameter SE stored in the parameter temporarily storing section 18 are read by a feature discriminating section 7 so as to be subjected to a comparison. The result of this comparison is transmitted as feature comparison data SF to a machining method determining section 8 where the machining method SG is transmitted determined. The machining method SG thus-determined is read and then processed by a step data generating section 9 for processing data for each of the generating processes. The step data generating section 9 prepares step machining data SH for each of the generating processes including information denoting the cutting shape, the cutting tool, the cutting conditions and the cutting order for each of the processes. The step machining data SH for each of the generating processes processed by the step data generating section 9, the before-machining shape SA stored in the before-machining shape storing section 3 and the after-machining shape SB stored in the after-machining shape storing section 4 are read by a display control section 10 so as to be converted into display data SI. The display data SI is displayed on a display device 12 via a display data output section 11. The step machining data SH for each of the machining processes processed by the step data generating section 9 is read by a numerical control information generating section 13 so as to be encoded. As a result, a numerical control information SJ is processed so as to be output to a magnetic tape 15, a floppy disk 16 or a communication signal 17 via a numerical control information output section 14.

Figure 2:
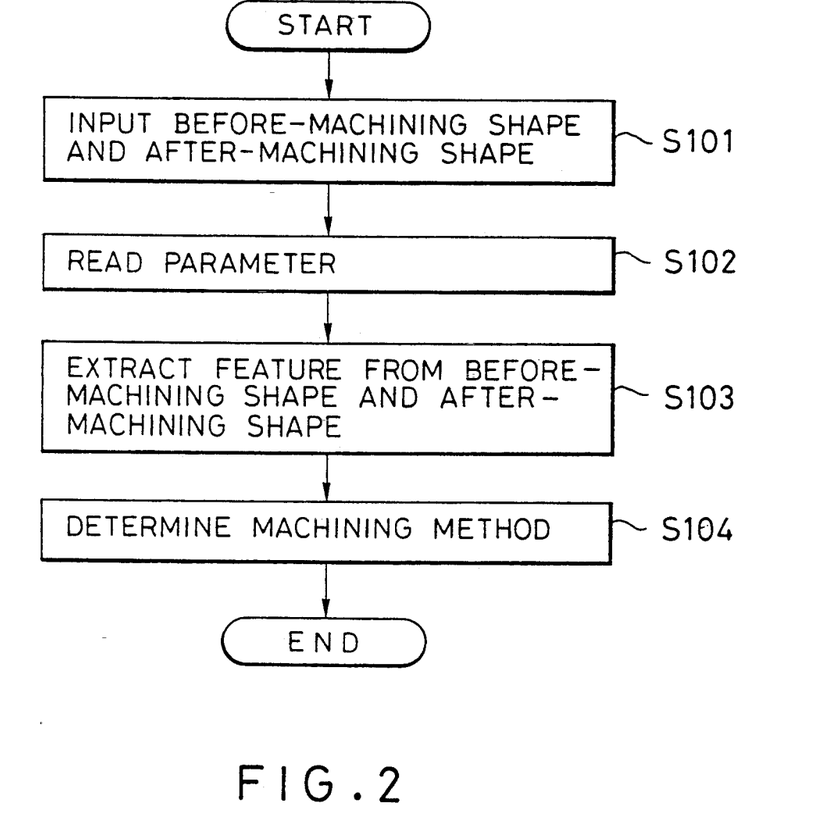
FIG. 2 is a flow chart which illustrates the operation of the same.

FIG. 2 is a flow chart which illustrates an example of the operation of an essential portion of the above-described conventional numerical control information generating apparatus.

First, the data input section 2 stores the before-machining shape SA and the after-machining shape SB, which have been input through the control panel 1, in the corresponding before-machining shape storing section 3 and the after-machining shape storing section 4 (Step S101). Then, the parameter temporarily storing section 18 reads and stores the machining method determining parameter SE from the parameter storing section 19 (Step S102). On the other hand, the feature extracting section 5 makes a comparison between the before-machining shape SA stored in the before-machining shape storing section 3 and the after-machining shape SB stored in the after-machining shape storing section 4. The feature extracting section 5 then extracts the shape feature SC, which serves as a factor for determining the machining method, from the shape data of the graphic elements which are necessary to perform the machining, so as to be stored in the feature temporarily storing section 6 (Step S103). When the feature discriminating section 7 has made a comparison between the shape feature SC stored in the feature temporarily storing section 6 and the machining method determining parameter SE stored in the parameter temporarily storing section 18 and subsequently the feature comparison data SF has been thereby processed, the machining method determining section 8 determines the machining method in accordance with the feature comparison data SF (Step S104). Thus, all of the processes are completed.

Figure 3:
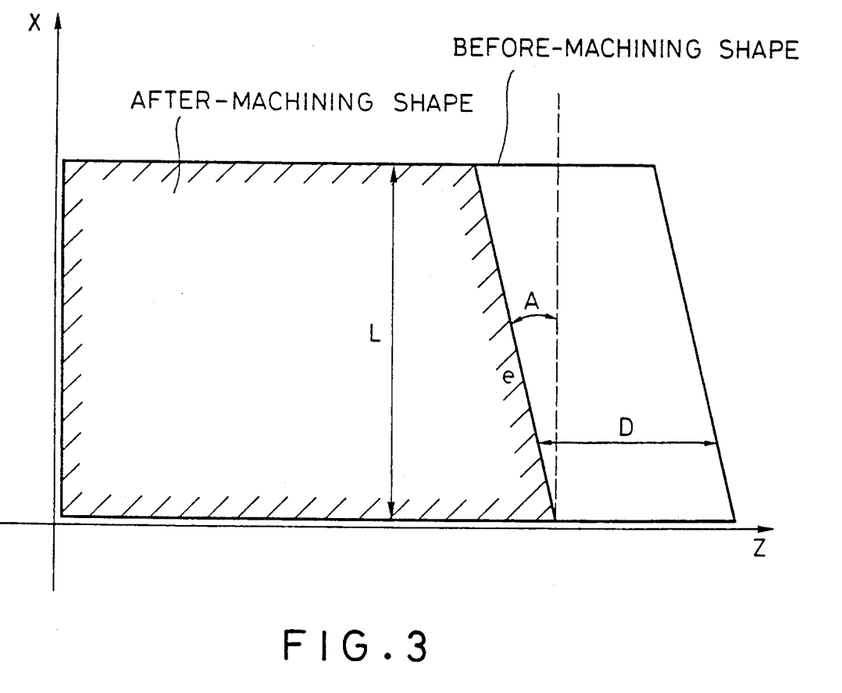
FIG. 3 illustrates a before-machining shape and an after-machining shape.
Figure 4:
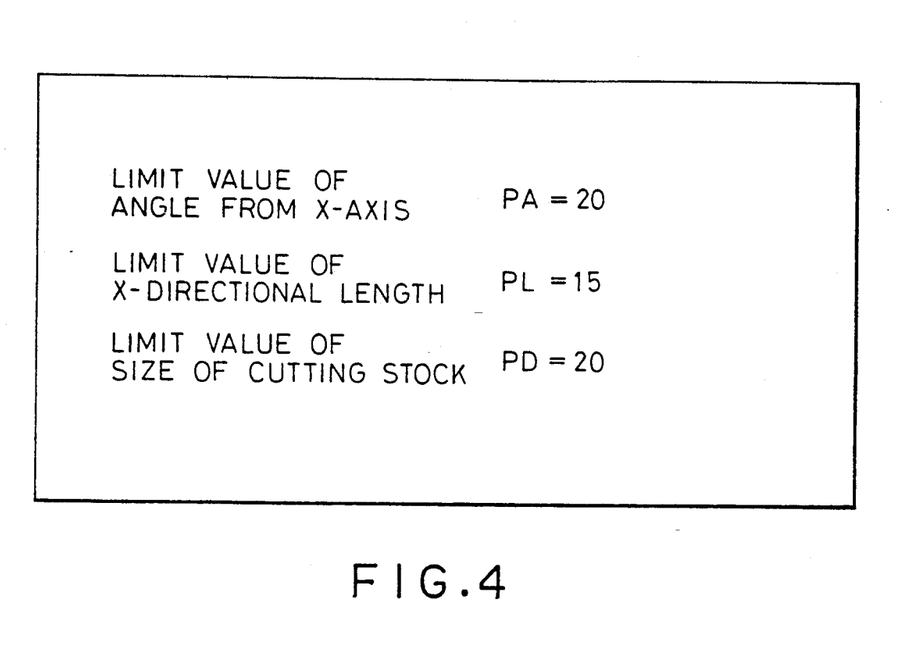
FIG. 4 illustrates an example of parameters for determining the machining method provided for the conventional numerical control information generating apparatus.

Reference is made to FIG. 3 for an example in which the more effective of either a face machining method or a longitudinal machining method is selected based on the before-machining shape and the after-machining shape input in the above-described apparatus of FIGS. 1A and 1B. The feature extracting section 5 extracts, as the shape feature SC serving as a factor for determining the machining method, an angle extending from the X-axis of the graphic element e an, X-directional length L of the graphic element e and size D of the cutting stock. The feature discriminating section 7 makes a comparison between the three factors A, L and D, which have been extracted by the feature extracting section 5 as the shape feature SC, and a limit value PA of the angle from the X-axis, a limit value PL of the X-directional length and a limit value PD of the size D of the cutting stock. Examples of the limit values PA, PL and PD are shown in FIG. 4. The machining method determining section 8 selects either the method of the face machining and the longitudinal machining method in accordance with the result of the above-made comparison. That is, if all the below conditions (1) to (3) are satisfied, the machining method of the graphic element e is determined to be face machining, and if at least one of them is not satisfied, the machining method of the graphic element e is determined to be longitudinal machining.

$$A \leq PA \quad (1)$$

$$L > PL \quad (2)$$

$$D \leq PD \quad (3)$$

Figure 5:
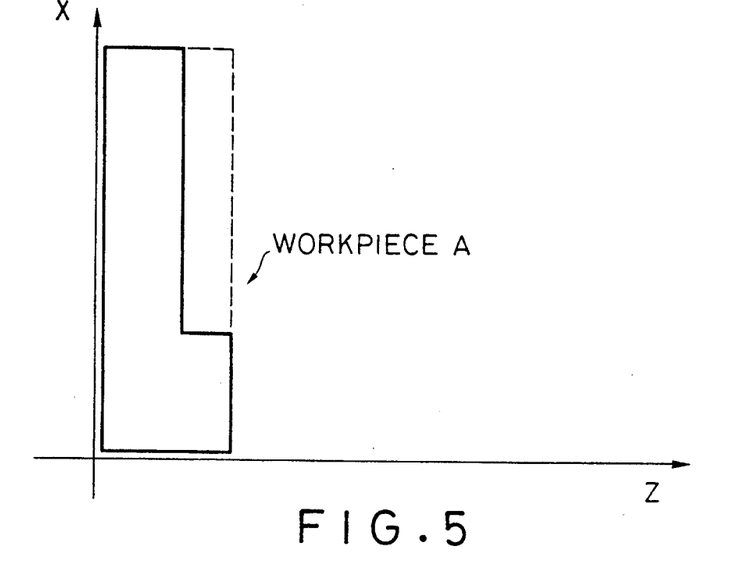
FIGS. 5 and 6 illustrate workpieces, respectively.
Figure 6:
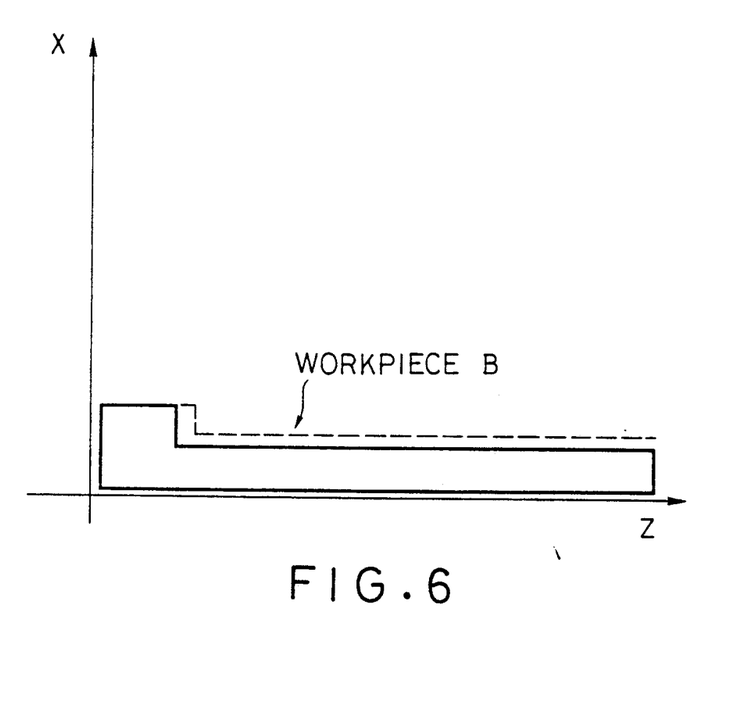

However, the above-described conventional numerical control information generating apparatus encounters a problem in that the most suitable machining method cannot always be obtained because it is determined in accordance with a single parameter set as shown in FIG. 4. For example, a workpiece A having a long X-directional length and a short Z-directional length as shown in FIG. 5 can be broken or deformed if a heavy cutting load is more often applied to it in the Z-direction. Therefore, it is preferable that the face machining be performed in comparison to the usual machining. On the contrary, a workpiece B having a short X-directional length and a long Z-directional length as shown in FIG. 6 can be broken or deformed if a heavy cutting load is applied to it in the X-direction. Therefore, it is more often preferable that the longitudinal machining be performed by a larger quantity in comparison to the usual machining. However, since the one kind parameter set is provided for the conventional numerical control information generating apparatus as described above, the machining method for both the workpieces A and B is determined in accordance with the same parameters. Therefore, a problem arises in that an operator must establish the parameter whenever the machining method is determined or must modify the manufacturing process data or the numerical control information processed in accordance with the determined machining method to obtain the most suitable machining method for each of the workpieces.

SUMMARY OF THE INVENTION

To this end, an object of the present invention is to provide a numerical control information generating apparatus capable of determining the most suitable machining method for the shape of a workpiece.

According to one aspect of the present invention, there is provided a numerical control information generating apparatus for generating numerical control information after a machining method has been determined in accordance with an input before-machining shape and an after-machining shape, the numerical control information generating apparatus comprising: storage means for storing a plurality of parameter-sets the components of which are parameters for determining the machining method; and a selection means for selecting a specified parameter-set from among the plurality of the parameter-sets in accordance with a command issued from an operator.

According to another aspect of the present invention, the machining method is determined to be either face machining or longitudinal machining.

The present invention is arranged in such a manner that a plurality of the parameter-sets, the components of which are parameter items for determining the machining method, are provided, whereby the most suitable machining method can be determined for the subject workpiece by selecting the most suitable parameter-set from among the plurality of the parameter-sets by an operator prior to determining the machining method.

Other and further objects, features and advantages of the invention will be appear more fully from the following description.

DETAILED DESCRIPTION OF PREFERRED EMBODIMENT

Figure 7A:
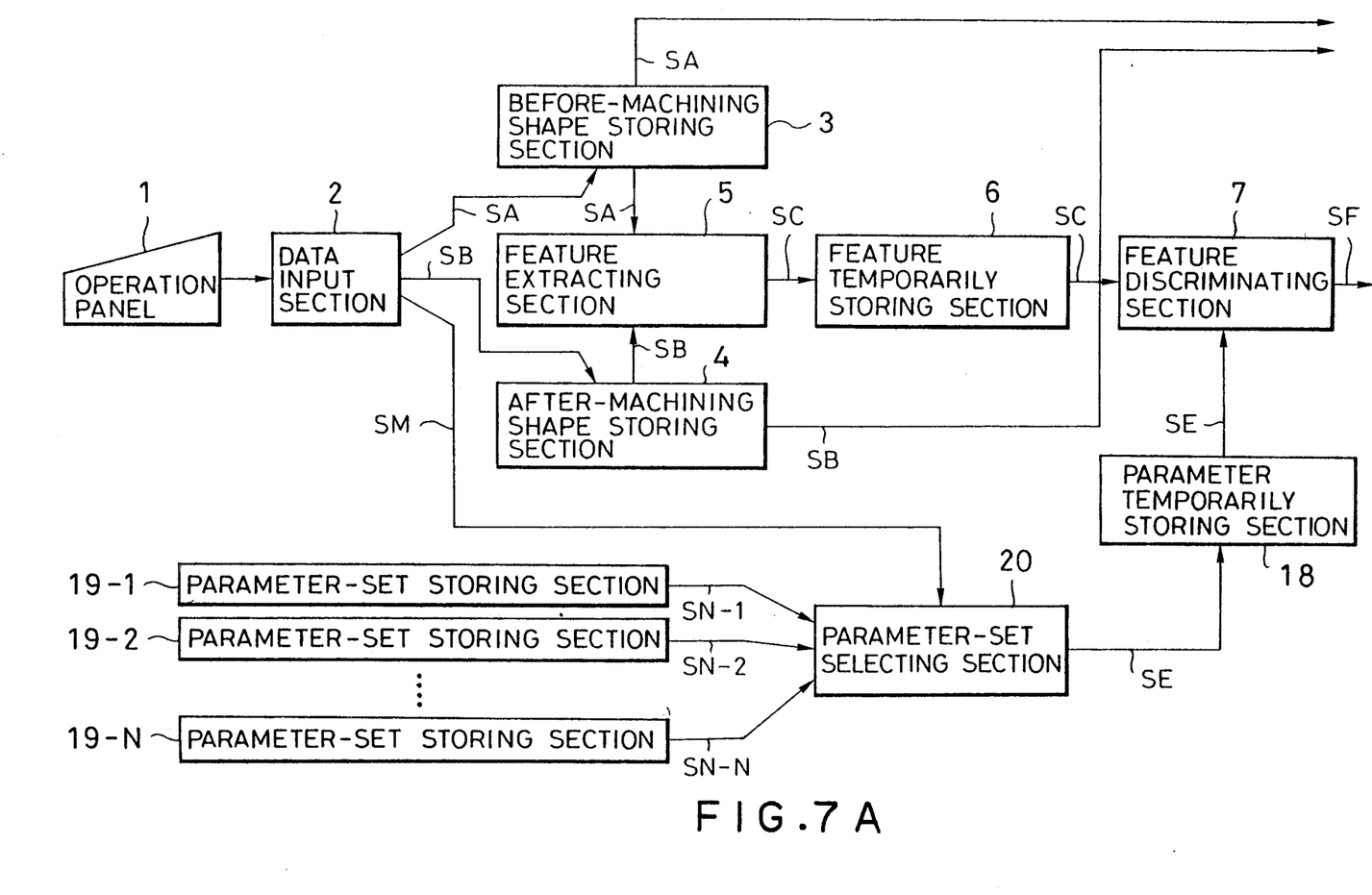
FIGS. 7A and 7B are block diagrams which illustrate an embodiment of a numerical control information generating apparatus according to the present invention.
Figure 7B:
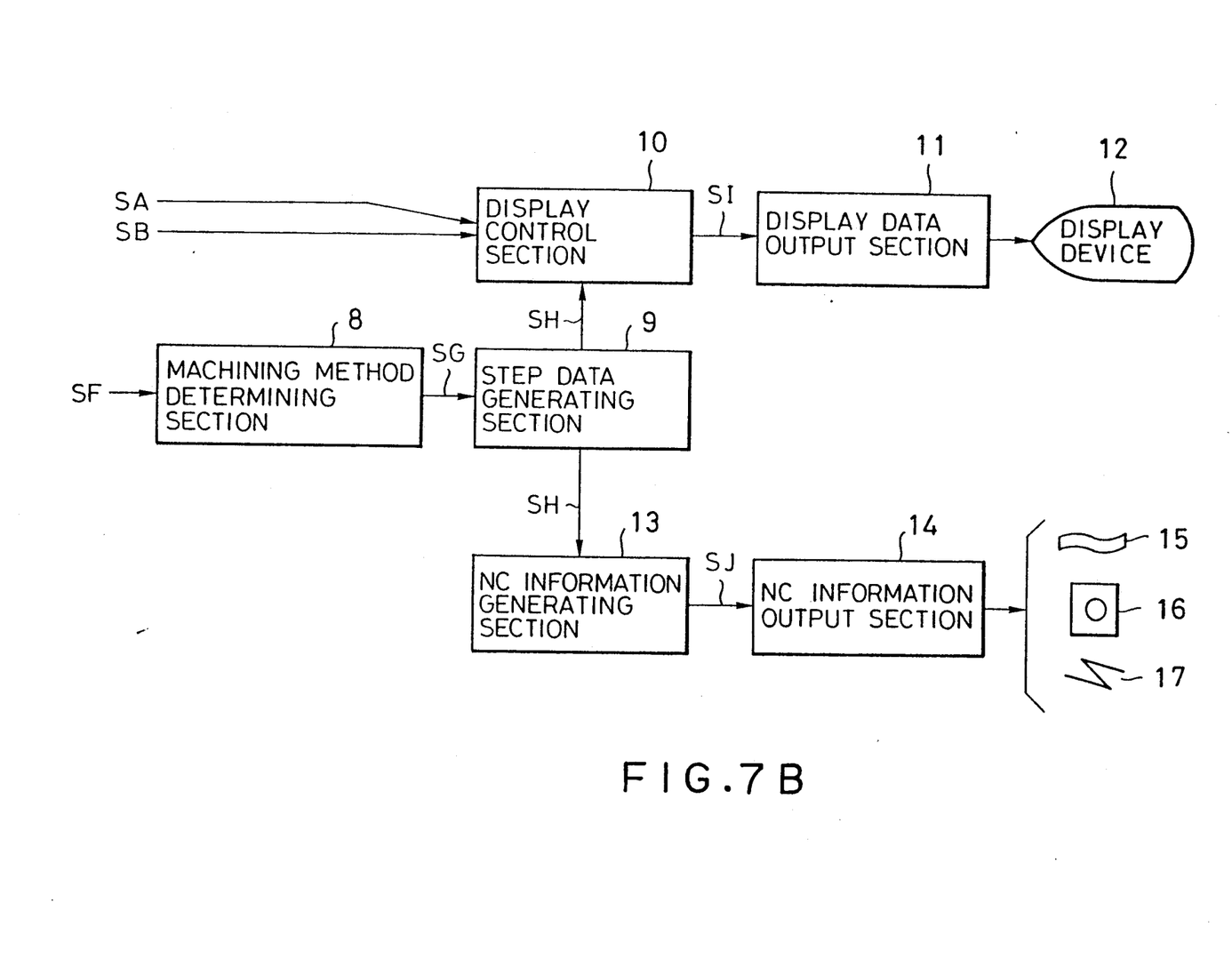

FIGS. 7A and 7B are block diagrams of an embodiment of a numerical control information generating apparatus according to the present invention which are illustrated to correspond to FIGS. 1A and 1B, where the same elements are given the same reference numerals and their descriptions are omitted.

Parameter-set selection command SM input by an operator through an operation panel 1 such as a keyboard is read by a data input section 2 so as to be transmitted to a parameter-set selecting section 20. On the other hand, N (N is an integer greater than 1) parameter-sets for determining the machining method are respectively provided in advance in parameter-set is storing sections 19-1 to 19-N. Thus, the structure is arranged in such a manner that a parameter-set is selected, in accordance with the parameter-set selection command SM transmitted from among the data input section 2 to the parameter-set selecting section 20, from among the parameter-sets SN-1 to SN-N stored in the parameter-set storing sections 19-1 to 19-N. The selected parameter-set is transmitted to the parameter temporarily storing section 18 as the machining method determining parameter SE.

Figure 8:
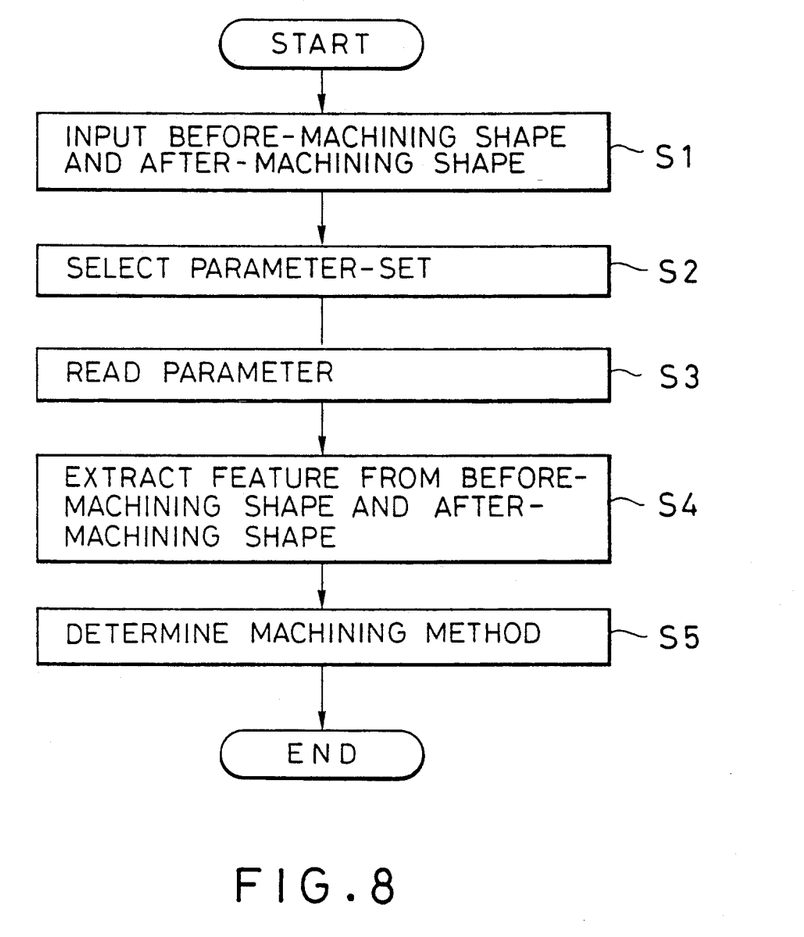
FIG. 8 is a flow chart which illustrates the operation of the same.
Figure 9:
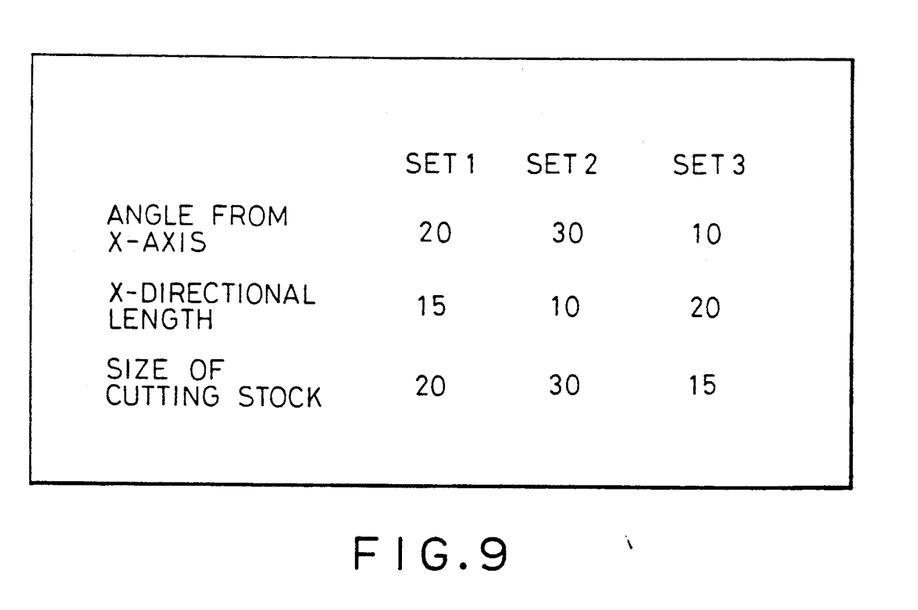
FIG. 9 illustrates an example of parameter sets for determining the machining method provided for the numerical control information generating apparatus according to the present invention.

FIG. 8 is a flow chart which illustrates the operation of an essential portion of the above-described numerical control information generating apparatus according to the present invention. The data input section 2 respectively stores the before-machining shape SA and the after-machining shape SB input through the operation panel 1 in the before-machining shape storing section 3 and the after-machining shape storing section 4 (Step S1). When an operator subsequently selects, through the control panel 1, a proper parameter-set from among a plurality of the parameter-sets as shown in FIG. 9, the data input section 2 transmits the parameter-set selection command SM to the parameter-set selecting section 20. The parameter-set selecting section 20 selects a parameter-set from among the parameter-sets SN-1 to SN-N stored in the parameter-set storing sections 19-1 to 19-N (Step S2). Then, the parameter-set selecting section 20 stores the selected parameter-set in the parameter temporarily storing section 18 as the parameter SE (Step S3). On the other hand, the feature extracting section 5 makes a comparison between the before-machining shape SA stored in the before-machining shape storing section 3 and the after-machining shape SB stored in the after-machining storing section 4. Then, the feature extracting section 5 extracts the shape feature SC, which serves as a factor for determining the machining method, from the shape data of the graphic elements which are necessary to perform the machining, so as to be stored in the feature temporarily storing section 6 (Step S4). When the feature discriminating section 7 has made a comparison between the shape feature SC stored in the feature temporarily storing section 6 and the machining method determining parameter SE stored in the parameter temporarily storing section 18 and thereby the feature comparison data SF has been processed, the machining method determining section 8 determines the machining method in accordance with the feature comparison data SF (Step S104). Thus, all of the processes are completed.

As described above, the numerical control information generating apparatus according to the present invention is capable of automatically determining the most suitable method of machining the subject workpiece by selecting a parameter-set from among a plurality of parameter-sets for determining the machining method. Therefore, the time and labor necessary to modify the parameters can be significantly reduced. Consequently, the machining efficiency can be improved satisfactorily.

Although the invention has been described in its preferred form with a certain degree of particularly, it is understood that the present disclosure of the preferred form can changed in the details of construction, and the combination and arrangement of parts may be resorted to without departing from the spirit and the scope of the invention as hereinafter claimed.

What is claimed is:

1. A numerical control information generating apparatus comprising:
   input means for generating data denoting a before-machining shape and an after-machining shape of a workpiece and data denoting a parameter set selection command in response to input commands of an operator;
   feature extraction means for determining and generating data denoting plural predetermined features of the workpiece based on said data denoting the before-machining shape and after-machining shape of the workpiece generated by said input means;
   parameter-set storing means for storing in advance a plurality of different parameters sets each including plural parameters respectively provided in correspondence to said plural predetermined features determined by said feature extraction means;
   parameter-set selection means for selecting one of said plurality of parameter sets stored in said parameter-set storing means in accordance with the data denoting said parameter set selection command generated by said input means;
   feature discriminating means for comparing each plural predetermined feature of the workpiece determined by said feature extraction means with a corresponding one of said plural parameters of the parameter set selected by said parameter-set discriminating means and for generating corresponding comparison results data;
   machining method determining means for determining a machining method to be used to machine the workpiece in accordance with the comparison results data generated by said feature extraction means; and,
   numerical control information generating means for generating numerical control information in accordance with said machining method determined by said machining method determining means.

2. An apparatus as recited in claim 1, wherein said machining method determining means determines said machining method to be either one of a face machining or a longitudinal machining.

* * * * *